(12) United States Patent
Sula

(10) Patent No.: US 6,608,768 B2
(45) Date of Patent: Aug. 19, 2003

(54) USE OF A RECTIFIED IMAGE VOLTAGE FOR CONTROLLING THE SWITCH ON THE PRIMARY SIDE OF A SWITCHED-MODE POWER SUPPLY

(75) Inventor: Matti Sula, Koski TL (FI)

(73) Assignee: Salcomp Oy, Kemijarvi (FI)

( * ) Notice: Subject to any disclaimer, the term of this patent is extended or adjusted under 35 U.S.C. 154(b) by 0 days.

(21) Appl. No.: 10/193,772

(22) Filed: Jul. 10, 2002

(65) Prior Publication Data

US 2003/0030422 A1 Feb. 13, 2003

(30) Foreign Application Priority Data

Aug. 7, 2001 (FI) .............................. 20011607

(51) Int. Cl.[7] ........................ H02M 3/335; H02M 5/42; H02M 7/44
(52) U.S. Cl. .............................. 363/18; 363/19; 363/97
(58) Field of Search ............................... 363/18, 19, 97

(56) References Cited

U.S. PATENT DOCUMENTS

| | | | |
|---|---|---|---|
| 4,172,276 A | | 10/1979 | Kameya |
| 5,657,211 A | | 8/1997 | Brockmann |
| 5,943,222 A | * | 8/1999 | Ogawa ........................ 363/19 |
| 5,978,234 A | * | 11/1999 | Nagahira ..................... 363/19 |
| 5,978,235 A | | 11/1999 | Lampinen |
| 6,166,923 A | * | 12/2000 | Rehm et al. ................. 363/19 |
| 6,198,637 B1 | * | 3/2001 | Hosotani et al. ............ 363/19 |
| 6,285,566 B1 | * | 9/2001 | Nakahira et al. ............ 363/19 |
| 6,314,004 B1 | * | 11/2001 | Higuchi .................... 363/21.07 |

FOREIGN PATENT DOCUMENTS

GB 2256291 12/1992

* cited by examiner

*Primary Examiner*—Bao Q. Vu
(74) *Attorney, Agent, or Firm*—Ware, Fressola, Van Der Sluys & Adolphson LLP

(57) ABSTRACT

A switched-mode power supply has primary and secondary sides, and a transformer (M1) with a primary winding, a secondary winding and an auxiliary winding. The primary winding and the auxiliary winding are connected to the primary side, and the secondary winding is connected to the secondary side. A switch element (T3) is connected to the primary winding in order to interrupt a current flowing in the primary winding. The switched-mode power supply contains a freely oscillating circuit (R5, C3, R7, T1, T2, R8, R9, R10, R11) for generating switching pulses to the switch element (T3). A rectifying and charge storing coupling (D4, C5) is connected between the terminals of the auxiliary winding in order to generate such an image voltage which on the primary side represents a certain voltage of the secondary side. The switched-mode power supply further contains a coupling (D3, R9) from said rectifying and charge storing coupling (D4, C5) to said freely oscillating circuit (R5, C3, R7, T1, T2, R8, R9, R10, R11) in order to control how switching pulses are generated on the basis of the value of said image voltage.

8 Claims, 5 Drawing Sheets

USE OF A RECTIFIED IMAGE VOLTAGE FOR CONTROLLING THE SWITCH ON THE PRIMARY SIDE OF A SWITCHED-MODE POWER SUPPLY

TECHNICAL FIELD

Generally the invention relates to the control of a switch on the primary side of a switched-mode power supply. Particularly the invention relates to generating switching pulses, which are supplied to the switch element on the primary side of a freely oscillating switched-mode power supply, so that the primary side utilises a rectified image voltage, which represents the behaviour of the voltage on the secondary side.

BACKGROUND OF THE INVENTION

In a known way a switched-mode power supply comprises a transformer which divides the power supply into primary and secondary sides. The primary side contains a switch element which at a certain frequency interrupts the current flowing through the primary winding of the transformer according to a certain duty cycle. Usually the switch element is a MOSFET (Metal Oxide Semiconductor Field Effect Transistor). As a switch element its operation is controlled by switching pulses, which are supplied to the gate of the MOSFET. The duty cycle of the switching pulses determines the momentary electric power supplied to the transformer. The frequency of the switching pulses is of importance mainly regarding dimensioning of the components in the switched-mode power supply.

In order to generate the switching pulses it is possible to use an oscillator with a fixed frequency, or a particular PWM controller (Pulse Width Modulation). However, in many cases it is advantageous to use a freely oscillating circuit on the primary side for generating the switching pulses, so that the frequency and the duty cycle of the circuit are adapted to the operating conditions of the switched-mode power supply. In generating switching pulses the object is to have the primary side to supply at each moment, controlled by the pulses, the optimal electric power to the secondary side through the transformer. The secondary side often contains measurement circuits in order to supervise the secondary current and/or the secondary voltage. The information provided by them is returned to the primary side, for instance via an opto-isolator, because safety aspects require galvanic isolation between the primary and secondary sides. For instance, if the measurement on the secondary side shows that the secondary voltage increases over its usual value, then the feedback through the opto-isolator to the switching pulse generating circuit reduces the duty cycle, and thus it reduces the amount of electric power supplied to the transformer.

It is known as such to implement the switched-mode power supply also as a so-called primary-controlled supply, i.e. without any feedback from the secondary side to the primary side. For instance, the patent publication U.S. Pat. No. 4,172,276 presents a switched-mode power supply which in addition to the primary and secondary windings of the isolating transformer has a third winding generating a certain auxiliary voltage on the primary side. The switching pulses controlling the switch transistor, which interrupts the primary current, are controlled by a reference voltage generated by certain capacitors and a zener diode, whereby a problem is particularly that the potential difference over the zener diode depends on the current passing through it. As one possibility the text presents to connect a constant current supply in parallel with the zener diode, but the actual invention presented in the publication is based on the fact that in order to generate a corrected reference voltage a compensating voltage is added to the voltage over the zener diode, so that the compensating voltage is generated according to the measured primary current. Thus there is a current measurement circuit on the primary side. On the other hand they also use an additional winding for detecting the waveform of the secondary voltage and to imitate it on the primary side. The original reference voltage which supplies current via the zener diode to the switch transistor base is generated just with the aid of this additional winding.

From the Finnish patent application no. FI-952571 there is known a coupling which controls the output voltage and current of a switched-mode power supply in a very versatile and accurate manner on the basis of only the functions of the couplings on the primary side. In the solution according to the publication the auxiliary winding in the isolation transformer generates an image voltage whose waveform corresponds to that of the secondary voltage. The image voltage is corrected with different correction terms, which compensate for its distortion as the output characteristics of the switched-mode power supply vary. The duty cycle of the switching pulses of the switch transistor is determined on the basis of the corrected image voltage. The switched-mode power supply according to the publication is intended to be used particularly in battery chargers, where the output current must remain almost constant as the output voltage rises, from a value corresponding to the terminal voltage of a completely discharged battery, to a value corresponding to the terminal voltage of a fully charged battery, and the output voltage must then remain below a certain maximum value, even if the fully charged battery then would not receive any essential current. The coupling according to the publication meets well the objectives placed on it, but regarding its structure it is rather complicated, which increases the manufacturing costs.

From the Finnish patent application no. FI-970063 there is known a primary-controlled switched-mode power supply according to FIG. 1, which in a normal state supplies a constant power via the transformer M101 to the secondary side, and where the auxiliary winding (the winding connected to the resistor R110 and the capacitor C105) of the transformer M101 on the primary side generates an auxiliary voltage representing the secondary voltage. Central components of the freely oscillating circuit, which generates the switching pulses, are the capacitor C104 and the transistor Q102. During the periods when the switch transistor Q101 is non-conducting the main part of the energy stored in the magnetic field of the transformer M101 is discharged to the secondary side. A part of the energy is however discharged through the auxiliary winding. The diode D105 acts as a rectifier, which in the point A forms a negative potential smoothed by the capacitor C123, whereby the absolute value of the potential is proportional to the secondary voltage. The zener diodes D108 and D109 regulate the operation on the primary side controlled by this potential. The threshold level in the reverse direction of the zener diode D108 is the higher of these. As the secondary voltage tends to rise the potential of the point A is the more negative the higher the secondary voltage is. When the reverse voltage over the zener diode D108 exceeds the reverse threshold level of said zener diode, then the zener diode starts to conduct in the reverse direction, which pulls the emitter of the transistor Q102 in the more negative direction. Then even a very small current induced by the primary current in the current loop formed by the auxiliary winding and the resistors R108 and R112 is sufficient to bring the transistor Q102 into the conducting state, whereby the conducting periods of the switch transistor Q101 will be very short, and the amount of energy which the primary side supplies to the isolating transformer will decrease. On the other hand, when the secondary voltage again decreases, then the absolute value of the potential in the point A on the primary side will decrease. When the zener diode D108 doesn't anymore conduct in the reverse direction, then the power supply will again operate according to the usual principle of constant power control.

If the secondary current continues to increase, then this will reduce the secondary voltage and the absolute value of the potential at the point A, proportional to the secondary voltage. As long as the point A is sufficiently negative in order to keep the zener diode D109 conducting in the reverse direction, then the potential at the base of the transistor Q103 remains low and the transistor Q103 is non-conducting. If the reverse direction voltage over the zener diode D109 falls below the reverse threshold voltage of the zener diode D109, then it stops conducting in the reverse direction, and a certain positive voltage appears via the resistor R111 at the base of the transistor Q103, whereby the transistor Q103 goes into the saturation state and forms a new current path between the transistor's Q102 emitter and the negative terminal of the rectified input voltage. At low currents the collector-emitter voltage of a typical npn-transistor in the saturation state is only about 50 mV, i.e. quite low compared to the forward voltage over the diode D107, which is about 0.6 V. This increases the discharging of the charge at the gate of the switch transistor Q101 during each operating cycle, which reduces the amount of electric power supplied to the isolating transformer.

In secondary-controlled switched-mode power supplies using feedback from the secondary side via an opto-isolator or some other galvanic isolating component to the primary side, the operation of the circuit becomes a problem in a case when the feedback is not acting in the desired way, due to a fault either in the measurement circuits on the secondary side or in the actual feedback. It would be desirable that the circuit operates in a controlled manner also in a situation like this. The known couplings further have that characteristic feature of analogue electronics, that any circuit and function would be even more advantageously realised if it would be possible to further reduce the number of components, the space they occupy in the device, and/or their manufacturing costs.

SUMMARY OF THE INVENTION

The object of the present invention is to present a switched-mode power supply which is advantageous regarding the manufacturing techniques and which has a low number of components. A further object of the invention is to present a switched-mode power supply which operates reliably also in exceptional situations. Further an object is to present a switched-mode power supply having advantageous EMC characteristics (ElectroMagnetic Compatibility).

The objects of the invention are attained by forming on the primary side a rectified image voltage which represents the secondary voltage, and by using this rectified image voltage for the control of freely oscillating circuits generating the switching pulses.

The characteristic features of a switched-mode power supply according to the invention are the use of a rectifying and charge storing coupling between the terminals of an auxiliary winding in order to generate an image voltage, which on the primary side represents a certain voltage of the secondary side, and the use of a coupling from said rectifying and charge storing coupling to a freely oscillating circuit in order to control how switching pulses are generated on the basis of the value of said image voltage.

The switched-mode power supply according to the invention utilises in the isolating transformer an auxiliary winding in addition to the actual primary and secondary windings, whereby the auxiliary winding on one hand supplies the "pumping" pulses required by the freely oscillating circuit generating the switching pulses, and whereby the auxiliary winding on the other hand is further connected to a coupling which rectifies and stores a charge on the primary side. The last mentioned coupling contains most advantageously a diode and a capacitor in series, which form a loop together with the auxiliary winding. In this loop an image voltage is generated over the capacitor, which voltage is proportional to that voltage which prevails between the output terminals of the secondary side.

The image voltage generated according to the invention can be utilised by different means for generating the switching pulses on the primary side. Common to these means is that changes in the image voltage act on the duty cycle and/or on the switching frequency in the same direction as would the corresponding changes measured in the secondary voltage.

In a simple overvoltage supervision the duty cycle is reduced with the aid of the image voltage in a situation where the secondary voltage tends to rise too much. The image voltage is coupled to a coupling which can be triggered by a threshold value, which coupling in the simplest case is a zener diode. If the image voltage exceeds the threshold value the last mentioned coupling begins to "leak" voltage to the oscillating circuit (or from this circuit), which forms the switching pulses. The potential change in the oscillating circuit resulting from such a leak reduces the duty cycle, which in turn reduces the amount of electric power supplied to the transformer and thus reduces the secondary voltage.

In a simple switched-mode power supply the overvoltage supervision realised with the aid of the image voltage can even be the only coupling which supervises the secondary voltage. In a feedback switched-mode power supply with secondary control it is also possible to secure a limited secondary voltage also in a fault situation when the measurement of the secondary voltage and/or the feedback of the measurement information to the primary side is not working, for some reason or other. In a securing arrangement of this kind the coupling which is triggered on the basis of the threshold value is connected in parallel with the phototransistor of the opto-isolator, whereby a limiting signal is obtained directly from the image voltage on the primary side if the opto-isolator is unable to deliver the limiting signal.

The use of the image voltage can be applied also in a secondary-controlled switched-mode power supply where the feedback has an "inverted" purpose compared to the normal one. A normal feedback means such a feedback which generates a limiting signal, i.e. it informs when the supply of electric power to the transformer must be limited. In the inverted feedback control the secondary side "requests" more electric power via the feedback, in other words, the feedback tells when the transformer should supply more electric power. Then the image voltage according to the invention is used to start the primary side, in other words to generate such switching pulses which cause electric power to be supplied to the secondary side even if the energy on the secondary side is not yet sufficient to use the transmitting component (the light-emitting diode, LED, of the opto-isolator) in the feedback.

As we studied the invention we also found a surprising aspect, according to which the connection of the auxiliary winding in the manner according to the invention substantially reduces such electromagnetic interference which is transmitted along the conductors to the mains network. The invention enables the switched-mode power supply to be constructed without a so called common mode choke in a filtering arrangement, whose task is to prevent radio frequency interference from propagating into the mains network, or without so called Y capacitors, which are normally used between the primary and secondary sides in order to reduce interference.

BRIEF DESCRIPTION OF DRAWINGS

The invention is described in more detail below with reference to advantageous embodiments presented as examples and to the enclosed figures, in which.

In connection with the above description of prior art We referred to FIG. 1, so in the following description of the invention and its advantageous embodiments we mainly refer to FIGS. 2a to 5. In the figures we use the same reference numerals for corresponding parts.

DETAILED DESCRIPTION OF THE INVENTION

Figure 2A:
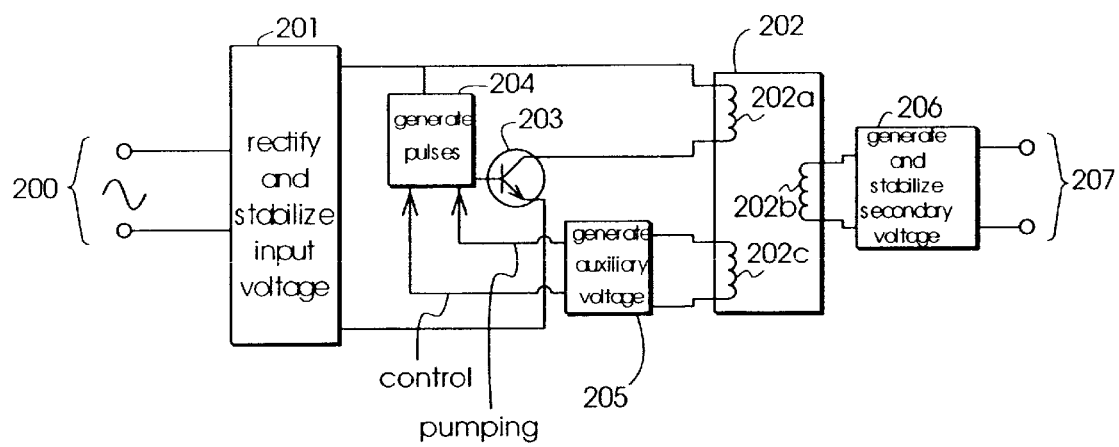
FIG. 2a shows schematically the inventive principle in a primary-controlled switched-mode power supply.

FIG. 2a is a basic drawing of a galvanically isolated switched-mode power supply comprising a circuit arrangement according to the invention for controlling the output voltage and current. The switched-mode power supply is connected to an alternating voltage through the input voltage terminal 200, whereby the alternating voltage can be for instance the voltage of the common mains network (in Finland 230 V, 50 Hz). The block 201 rectifies and stabilises the input voltage and prevents interference generated in the power supply from propagating into the AC network. The primary winding 202a of the isolating transformer 202 and the switch transistor 203 form a series circuit connected to the rectified input voltage, where the switch transistor 203 interrupts the current passing through the primary winding 202a, according to which kind of switching pulses are supplied to its base from the pulse generating block 204. The pulse generation is partly controlled by the block 205 which generates the auxiliary voltage with the aid of the auxiliary winding 202b in the transformer 202. In this case there are two signal lines from the auxiliary voltage generating block 205 to the pulse generating block 204, of which lines the first one "pumps" the pulse generating block 204 in order to maintain the oscillation, and the second one controls the operation of the pulse generating block so that changes in the duty cycle result in that the electric power supplied to the transformer 202 changes in a desired manner. The secondary winding 202c of the transformer 202 is connected to a block 206 which generates and stabilises the secondary voltage, and which on the other side has the output voltage interface 207. The output voltage of the switched-mode power supply is the voltage between the terminals of the interface 207, and the output current is the current passing between these terminals.

The switched-mode power supply according to the FIG. 2a operates in the following way. The pulse generating block 204 generates switching pulses, which alternately bring the switch transistor 203 into the conducting state and the nonconducting state. Due to the voltage generated by the block 201 a current always passes in the primary winding 202a as the transistor 203 is in the conducting state. A change of the current stores energy in the magnetic field of the transformer 202. As the transistor 203 ceases to conduct the energy stored in the magnetic field is discharged mainly through the secondary winding 202c into the block 206, which generates and stabilises the secondary voltage. A small part of the energy is also discharged through the auxiliary winding 202b in the block 205 which generates the auxiliary voltage. The energy is discharged periodically, but by rectifying and filtering it can be formed into an auxiliary voltage, substantially of a direct boltage nature. Because the magnetic coupling between the different windings of the transformer 202 is constant and does not depend on the values of the current or voltage, the value of the auxiliary voltage is proportional to the value of the secondary voltage and thus to the value of the output voltage.

In normal conditions the secondary voltage generating and stabilising block 206 generates to the output voltage interface 207 a certain normal output voltage with a value which depends on the dimensioning of the components of the switched-mode power supply. If the output current is reduced, for instance when a battery being charged and connected to the output voltage interface 207 becomes fully charged, then the output voltage tends to rise. According to the above description this is reflected also as an increase of the absolute value of the auxiliary voltage in the block 205. Correspondingly, if the output current increases during constant power control, then the output voltage decreases, which is reflected as a reduction of the absolute value of the auxiliary voltage in the block 205. Through the control connection from the auxiliary voltage generating block to the pulse generating block 204 the first mentioned adjusts the generating of the switching pulses so that the detected change is compensated in the best possible way.

Of those functional blocks shown in FIG. 2a the invention relates mainly to the blocks 204 and 205. The functions according to the blocks 201 and 206 are known as such, even if the invention also affects the function of the block 201. As is common in analogue techniques, in practice the functional blocks do not have to be clearly separated structural entities, but they can be interspersed into each other in many ways.

Figure 2B:
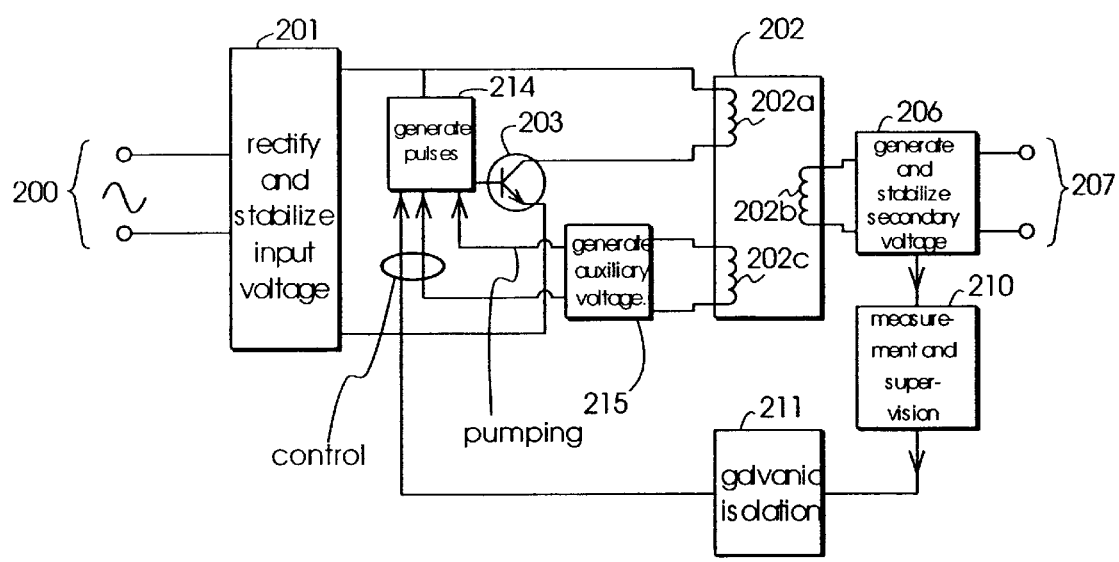
FIG. 2b shows schematically the inventive principle in a secondary-controlled switched-mode power supply.

FIG. 2b shows how the invention is applied in a secondary-controlled switched-mode power supply. The blocks 200, 201, 202, 203, 206 and 207 can be substantially similar to those above. According to the secondary control principle there is a measurement and supervision block 210 on the secondary side, which block measures the secondary current and/or voltage and generates a supervision signal on the basis of the measurement. The feedback for returning the supervision signal to the primary side passes through the galvanic isolation block 211. The operation of the pulse generating block 214 is now controlled both by the supervision information obtained from the secondary side via the galvanic isolation block 211 and by the auxiliary voltage generating block 215, according to a certain division of the functions.

Figure 3:
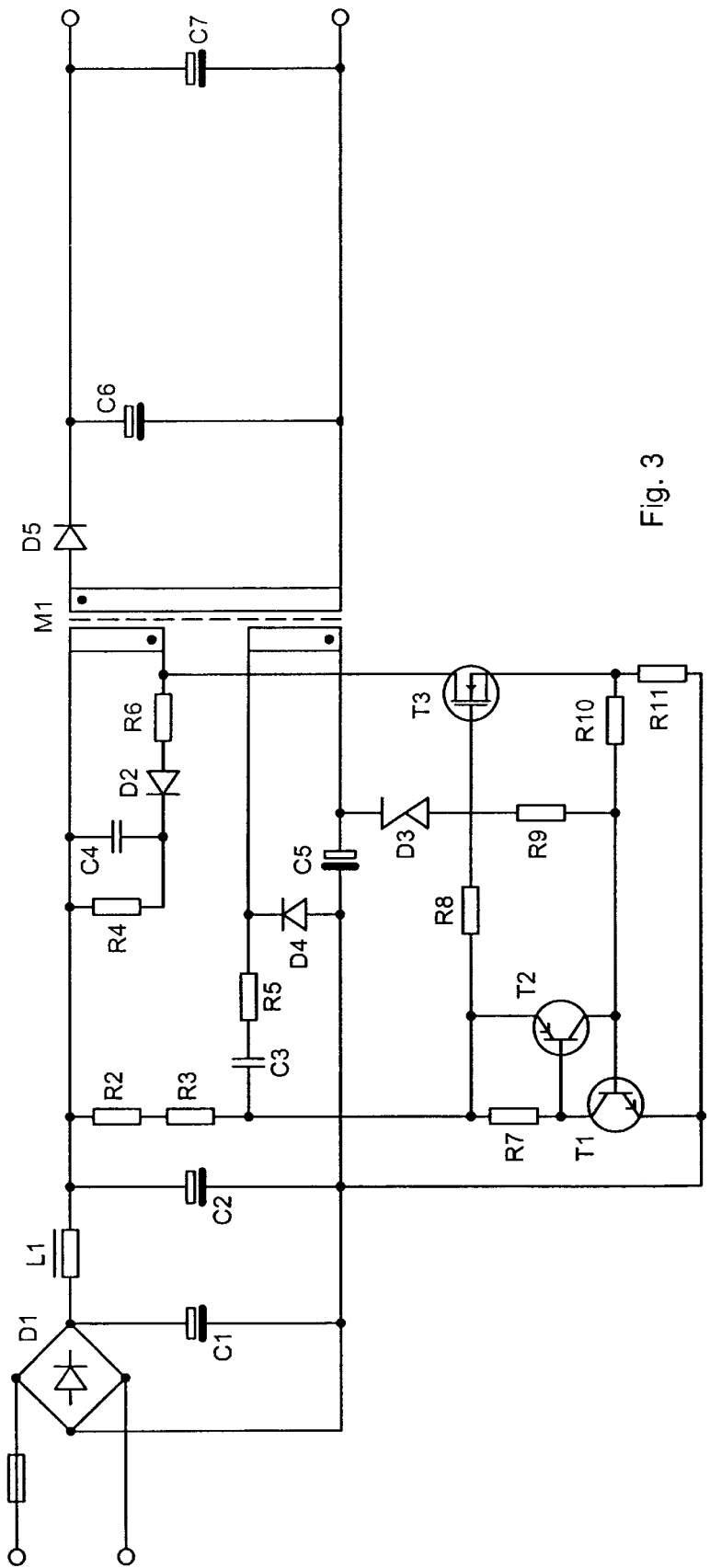
FIG. 3 shows a switched-mode power supply according to a first embodiment of the invention.

FIG. 3 shows a primary-controlled switched-mode power supply according to a first embodiment of the invention where the auxiliary voltage is used to control the output voltage generated on the secondary side does not exceed a certain limit. From the alternating voltage connected to the input, the rectifier D1 produces a rectified voltage which is filtered with the aid of the capacitors C1 and C2 and the inductance L1. The positive terminal of the filtered and rectified operating voltage is connected to the first terminal of the primary winding of the transformer M1. The coupling formed by the resistors R4 and R6 and the capacitors C4 and D2 between the terminals of the primary winding of the transformer M1 cuts rapid voltage peaks appearing over the primary winding, which reduces the "ringing" of the winding. For this purpose the resistor R6, the forward biased diode D2 and the capacitor C4 form in this order a series coupling from the second terminal of the primary winding to the first terminal. The resistor R4 is further connected in parallel with the capacitor C4. The second terminal of the primary winding of the transformer M1 is connected to the drain of the n-channel MOSFET T3 represeniting the switch element. The source of the MOSFET T3 is connected via the resistor R11 to the negative terminal of the filtered and rectified operating voltage.

The switching pulses supplied to the gate of the MOSFET T3 are generated according to the forward principle known as such in a circuit, which comprises the auxiliary winding of the transformer M1, the resistor R5 and the capacitor C3 in a series RC coupling connected to the first terminal of the auxiliary winding, the bipolar transistors T1 and T2 forming a thyristor coupling, the resistor chain R2, R3 and R7 from the positive terminal of the filtered and rectified operating voltage to the collector of the transistor T1, and the resistors R8 and R10. The series RC coupling of the resistor R5 and capacitor C3 connects the first terminal of the auxiliary winding to a point between the resistors R3 and R7, and at the same time to the emitter of the pnp-transistor T2, whereby the emitter is further connected through the resistor R8 to the gate of the MOSFET T3. The second terminal of the auxiliary winding of the transformer M1 is isolated with the aid of the capacitor C5 from the negative terminal of the filtered and rectified operating voltage. The capacitor C5 forms together with the diode D4 a series coupling between the terminals of the auxiliary winding. In addition there is a series coupling formed by the reverse direction zener diode D3 and resistor R9 from the second terminal of the transformer M1 to the base of the transistor T1. The resistor R10 connects the source of the MOSFET T3 to the base of the transistor T1.

In this embodiment the secondary is simply formed by the secondary winding of the transformer M1, the series coupling of the diode D5 and the capacitor C6 between the terminals of the secondary winding, and the filtering capacitor C7 between the output terminals, which capacitor regarding the circuit technique is in parallel with the capacitor C6, and thus the filtering capacitor could be combined with the capacitor C6 to a single secondary capacitor.

The operation of the circuit according to FIG. 3 is described below. The operation of the rectifying and stabilising parts for the input voltage is well known and not dealt with here. When the power to the device is switched on, the current passing through the resistor chain R2–R3 charges the capacitor C3 to the full level, whereby the potential at the gate of the switch transistor T3 rises to a positive level, and the switch transistor becomes conducting. A growing electric current begins to flow through the primary winding of the transformer M1, the switch transistor T3 and the resistor R11, whereby this current stores energy into the transformer's magnetic field. At the same time the potential of the point between the switch transistor T3 and the resistor R11 begins to rise, which increases the base-emitter voltage of the transistor T1. When the base-emitter voltage of the transistor T1 has increased to a sufficiently high level the thyristor coupling formed by the transistors T1 and T2 is triggered and discharges the charge which was present at the gate of the switch transistor T3. The switch transistor T3 ceases to conduct, whereby the energy stored in the magnetic field of the transformer M1 is mainly discharged to the secondary side. However, a part of the energy is discharged through the auxiliary winding, whereby it induces in the auxiliary winding a current with a direction opposite to that small current, which was induced in the auxiliary winding due to the current in the primary winding. The coupling formed by the auxiliary winding, the capacitor C5 and the diode D4 accumulates the charge carried by this induced current into the capacitor C5, corresponding to the operation of the components C6 and D5 in the secondary circuit. When all the energy charged into the transformer M1 has been discharged, the operation cycle is restarted from the beginning. The thyristor coupling formed by the transistors T1 and T2 ceases to conduct quite soon after it was triggered, because when the charge at the gate of the switch transistor T3 has been discharged the potential at the emitter of the transistor T2 is lowered, and because an interruption of the primary current means that the base of the transistor T1 is coupled via the resistors R10 and R11 to the ground potential.

Between the terminals of the capacitor C5 there thus appears an image voltage, which on the primary side represents the behaviour of the secondary voltage. The activity continues in the above described manner as long as the magnitude of this image voltage does not exceed the reverse threshold voltage of the zener diode D3. However, if the secondary voltage tends to exceed a certain value, then also the image voltage representing it on the primary side will increase until the reverse threshold voltage of the zener diode D3 is exceeded. Then the zener diode D3 will "leak" a part of the threshold voltage to the base of the transistor T1, which makes the thyristor coupling T1/T2 to trigger earlier in each switching cycle, and thus it reduces the duty cycle.

Figure 4:
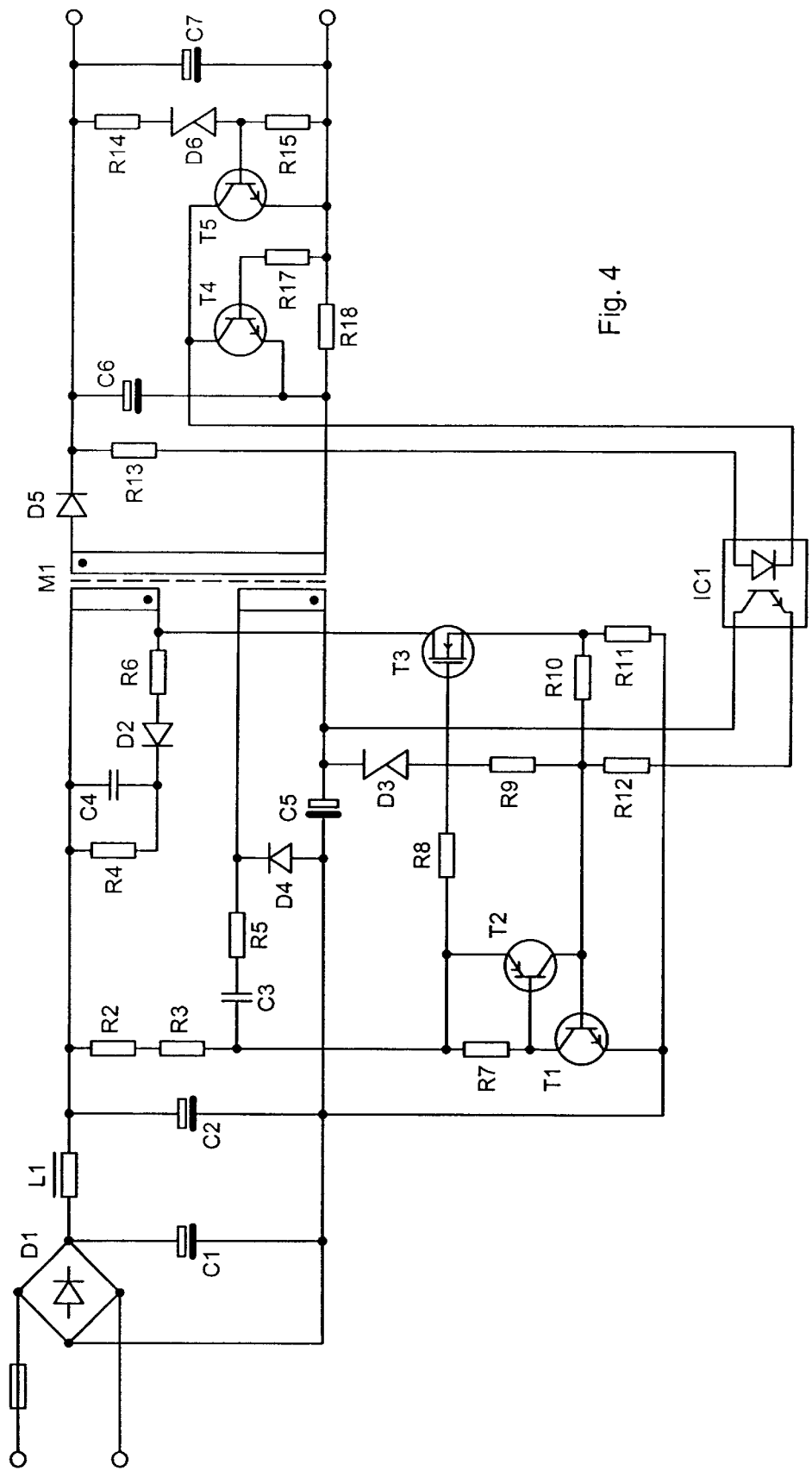
FIG. 4 shows a switched-mode power supply according to a second embodiment of the invention.

FIG. 4 shows a supplement to the coupling shown in FIG. 3. The switched-mode power supply shown in FIG. 4 is primarily a secondary-controlled one. The secondary control is realised so that the transistor T4 measures the secondary current (i.e. the drop in voltage over the series connected resistor R18 in the secondary circuit), and the transistor T5 measures the secondary voltage (actually a portion of it, which is taken with the aid of a division circuit formed by the resistor R14, the reverse direction zener diode D6 and the resistor R15). The collectors of the npn-type transistors T4 and T5 are connected to the cathode of the LED in the opto-isolator. IC1. The anode of the LED is connected via the resistor R13 to the positive terminal of the output voltage. The base voltages are taken to the transistor T4 through the resistor R17 from the negative terminal of the output voltage, and to the transistor R17 from the negative terminal of the output voltage, and to the transistor T5 through the division circuit formed by the resistor R14, a reverse direction zener diode D6 and the resistor R15, from a point between the zener diode D6 and the resistor R15. The emitter of the transistor T5 is connected to the negative terminal of the output voltage, and the emitter of the transistor T4 is connected to the more negative terminal of the secondary winding of the transformer M1.

In the case of FIG. 4 the collector of the phototransistor in the opto-isolator IC1 is connected to the positive terminal of the capacitor C5 maintaining the image voltage on the primary side, and the emitter is connected via the resistor R12 to the base of the transistor T1.

The operation of the secondary control follows the known principle that either one of the transistors T4 or T5 becomes conducting, depending on whether the secondary current or voltage is increasing to exceed the allowed value: then the LED of the opto-isolator IC1 will light up and make the phototransistor conducting. Voltage leaks through the phototransistor to the base of the transistor T1, which makes the thyristor coupling T1/T2 to trigger earlier and thus reduces the duty cycle, and through this the amount of electric power supplied to the transformer M1.

In the coupling of FIG. 4 the image voltage according to the invention has a securing role. The threshold voltage of the zener diode D3 and the resistances of the resistors R9, R10 and R11 are dimensioned so that when the secondary control operates normally the threshold voltage of the zener diode D3 will not be exceeded at all. If the secondary control ceases to function due to some reason or other and the secondary voltage tends to rise, then the voltage leak occurring through the zener diode to the electrode which triggers the thyristor coupling T1/T2 will limit the supply of energy in the same way as was described above regarding the FIG. 3.

Figure 5:
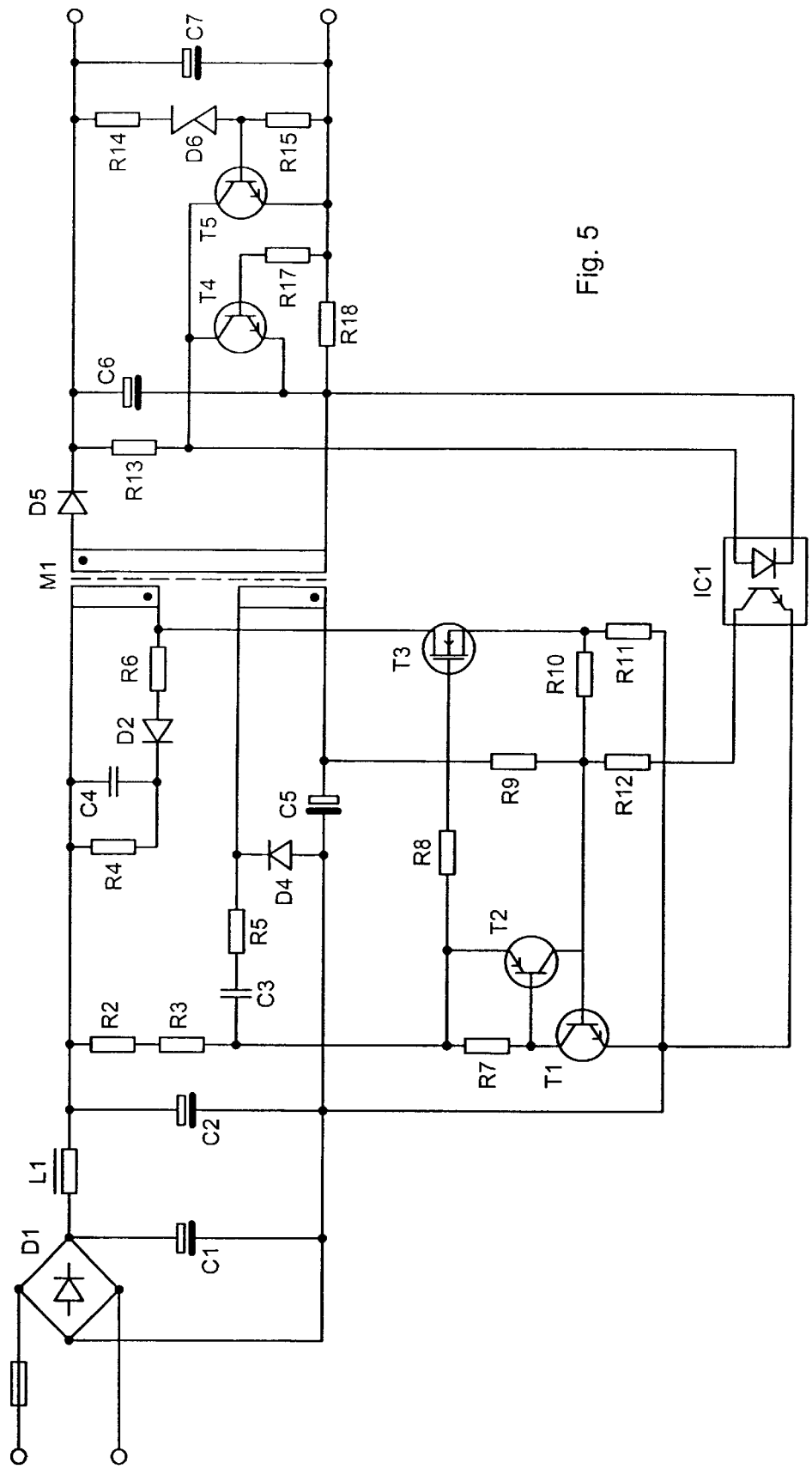
FIG. 5 shows a switched-mode power supply according to a third embodiment of the invention.

FIG. 5 shows a secondary-controlled switched-mode power supply where the secondary control obeys a principle which is the inverse compared to that described above. In FIG. 5 the measurement transistors T4 and T5 are in other respects connected on the secondary side in a similar way as in FIG. 4, but instead of the cathode their collectors are connected to the anode of the LED in the opto-isolator. The cathode of the LED of the opto-isolator is connected to the more negative terminal of the secondary winding of the transformer M1. The collector of the phototransistor of the opto-isolator IC1 is now connected through the resistor R12 to the base of the transistor T1, and the emitter of the phototransistor is connected to the naegative terminal of the filtered and rectified operating voltage of the primary side.

Even a slight secondary voltage in the switched-mode power supply of FIG. 5 is sufficient to turn on the LED of the opto-isolator IC1, if the voltage is not for a very particular reason removed from the LED by setting at least one of the transistors T4 or T5 into the conducting state. This means that the LED begins to turn off if the secondary voltage or current exceeds its usual value. On the other hand it must be ensured that the supply of energy to the transformer does not get out of hand due to a possible failure in the secondary control.

The last mentioned supervision is performed in a manner according to the invention. Because the resistor R9 now connects the positive terminal of the capacitor C5 maintaining the image voltage directly to the base of the transistor T1, a part of the image voltage will always leak to the base of the transistor T1, which in a way described above tends to decrease the duty cycle and to reduce the supply of energy to the transformer. The positive potential of the base of the transistor T1 is reduced only when the LED of the opto-isolator IC1 is on, because then the phototransistor of the opto-isolator IC1 is in the conducting state, and via the resistor R12 it "pulls" the potential of the base of the transistor T1 into a more negative direction.

Further, in a manner obvious to a person skilled in the art, it is advisable to dimension the resistance of the source resistor R11 (or alternatively the resistor R10) of the switch transistor T3 so that it is slightly larger than in FIGS. 3 and 4, so that the connection over this path to the negative terminal of the filtered and rectified operating voltage does not pull the potential at the base of the transistor T1 too low.

Figure 1:
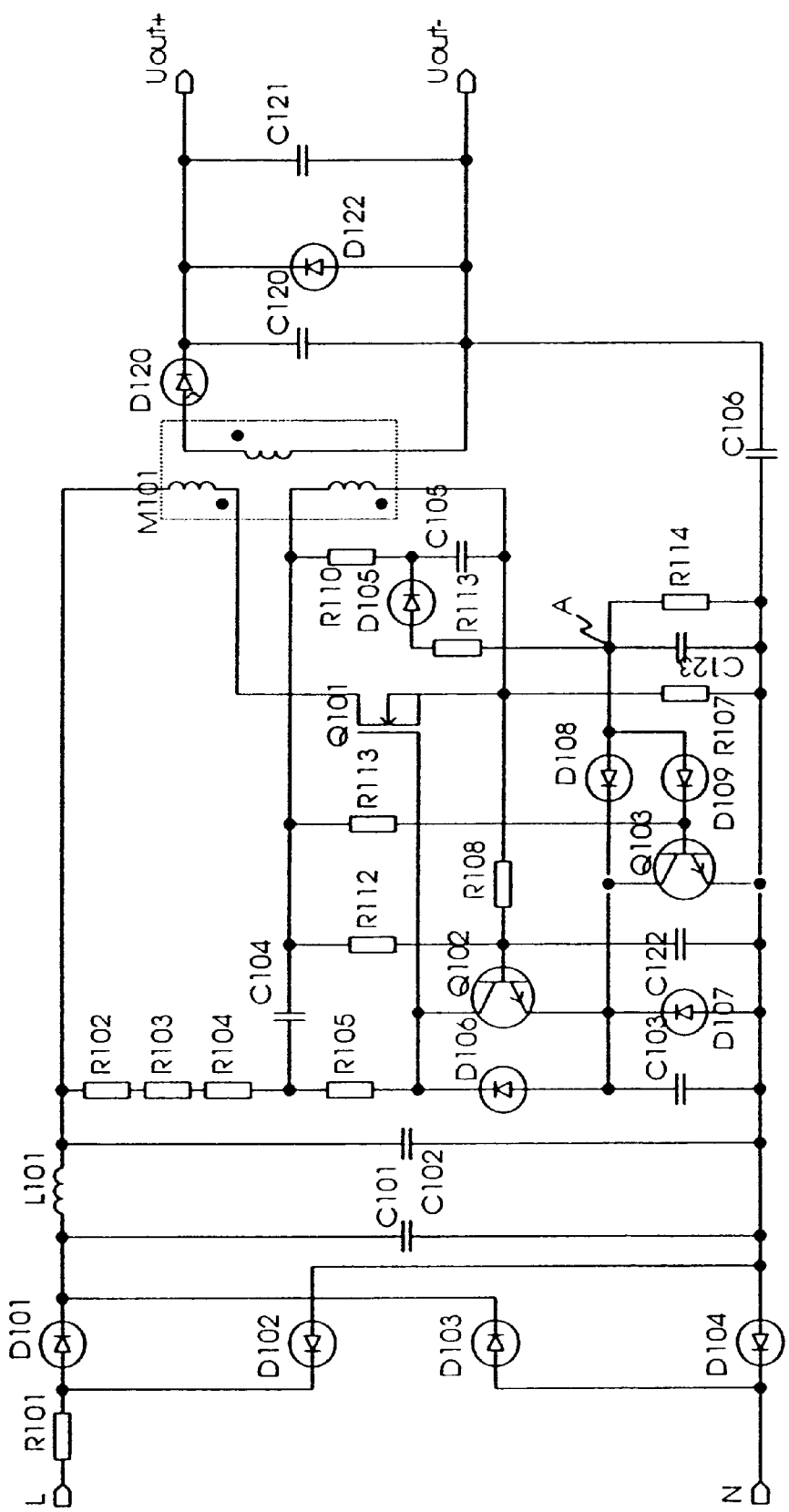
FIG. 1 shows a prior art primary-controlled switched-mode power supply.

Laboratory examination of the circuits according to FIGS. 3, 4 and 5 shows that the so called conducted RF interference from the switched-mode power supply through the rectifier D1 in the "upstream" direction towards the main network is substantially lower than in prior art switched-mode power supplies. This appears to be due to the fact that when the diode D4 and the capacitor C5 are coupled in series between the terminals of the auxiliary winding in the manner shown in FIGS. 3, 4 and 5, the coupling operates as a so called compensation regarding the operation of the transformer M1. The switched-mode power supplies according to FIGS. 3, 4 and 5 can be implemented and made to meet certain generally approved interference level standards without a common mode choke, which normally forms a part of the rectifying and filtering arrangement connecting the switched-mode power supply to the main network. Further, the switched-mode power supplies according to FIGS. 3, 4 and 5 can be realised without a so called Y-capacitor between the primary and secondary sides, which capacitor (the capacitor C106) must be present in the prior art switched-mode power supply shown for instance in FIG. 1. Both the choke and the Y-capacitor are bulky components, so it is an essential advantage to achieve the performance according to the standards without them. This advantage is still emphasized by the fact that a common mode choke is a relatively expensive component, and that a Y-capacitor, even if it is selected according to the electric safety regulations, always will present a potential risk for electrical breakdown if the switched-mode power supply is subjected to very exceptional conditions, such as to a stroke of lightning.

The above-presented advantageous embodiments of the invention are not intended to restrict the applicability of the claims. The inventive features presented in the dependent claims can be freely combined, if not otherwise stated.

What is claimed is:

1. A switched-mode power supply, comprising:
    a primary side and a secondary side,
    a transformer with a primary winding, a secondary winding and an auxiliary winding, of which the primary winding and the auxiliary winding are connected to the primary side and the secondary winding is connected to the secondary side,
    a switch element connected to the primary winding for interrupting a current flowing in the primary winding,
    a freely oscillating circuit for generating switching pulses to the switch element,
    a rectifying and charge storing coupling between the terminals of the auxiliary winding for generating an image voltage, which on the primary side represents a certain voltage of the secondary side, and
    a coupling from said rectifying and charge storing coupling to said freely oscillating circuit for controlling, on the basis of the value of said image voltage, how switching pulses are generated.

2. A switched-mode power supply according to claim 1, wherein:
    the freely oscillating circuit contains a semiconductor switch having a certain electrode whose potential determines when the semiconductor switch is in conducting state, which conducting state is arranged to correspond to the end of a switching pulse, and the coupling from said rectifying and charge storing coupling to said freely oscillating circuit is arranged to change the potential of said certain electrode as a response to a change in the image voltage.

3. A switched-mode power supply according claim 2, wherein:

said semiconductor switch is a thyristor coupling which is triggered as a response to a sufficiently positive potential at its certain electrode, and the coupling from said rectifying and charge storing coupling to said freely oscillating circuit is arranged to change the potential of said certain electrode of said thyristor coupling to be more positive in a situation where the image voltage exceeds a certain limiting value.

4. A switched-mode power supply according to claim 3, which switched-mode power supply is a primary-controlled switched-mode power supply where the primary control equals the coupling from said rectifying and charge storing coupling to said freely oscillating circuit.

5. A switched-mode power supply according to claim 3, which switched-mode power supply is a secondary-controlled switched-mode power supply.

6. A switched-mode power supply according to claim 5, wherein:

on the secondary side there is a circuit for measuring a certain electrical quantity, which circuit is arranged to generate an activating signal to the primary side in a situation where the measurement indicates that said electrical quantity has exceeded a certain limiting value, the switched-mode power supply includes a switch component which is arranged to react on said activating signal by changing the potential of said electrode of the thyristor coupling to be more positive, and the operation of said measurement circuit and said switch component is arranged to be activated as a response to an increase in the value of the measured quantity, which increase is smaller than what would be needed in order to increase the image voltage to a value where the coupling from said rectifying and charge storing coupling to said freely oscillating circuit would change the potential of said certain electrode of the thyristor coupling to be more positive.

7. A switched-mode power supply according to claim 5, wherein:

the secondary side contains a circuit for measuring a certain electrical quantity, which circuit is arranged to provide an activating signal to the primary side in a situation where the measurement indicates that said electrical quantity is lower than a certain limiting value, the switched-mode power supply contains a switch component which is arranged to react on said activating signal by changing the potential of said electrode of the thyristor coupling to be more negative.

8. A switched-mode power supply according to claim 1, wherein the rectifying and charge storing coupling connected between the terminals of the auxiliary winding contains a diode and a capacitor connected in series, of which the diode is arranged to enable a current flow in a loop formed by the auxiliary winding, the diode and the capacitor in that direction, in which the current tends to flow when the switch element connected to the primary winding is in the non-conducting state.

* * * * *

UNITED STATES PATENT AND TRADEMARK OFFICE
CERTIFICATE OF CORRECTION

PATENT NO. : 6,608,768 B2
DATED : August 19, 2003
INVENTOR(S) : Sula

It is certified that error appears in the above-identified patent and that said Letters Patent is hereby corrected as shown below:

<u>Column 6,</u>
Line 25, "boltage" should be -- voltage --

<u>Column 8,</u>
Line 59, after "opto-isolator" "." should be deleted

<u>Column 9,</u>
Line 45, "naegative" should be -- negative --

Signed and Sealed this

Sixth Day of April, 2004

JON W. DUDAS
*Acting Director of the United States Patent and Trademark Office*